United States Patent [19]

Amsel et al.

[11] Patent Number: 5,329,069
[45] Date of Patent: Jul. 12, 1994

[54] KITCHEN APPLIANCE WITH WEIGHING DEVICE

[75] Inventors: Klaus Amsel, Oberursel; Albrecht Weller, Steinbach; Klaus Kötterheinrich, Mühlheim, all of Fed. Rep. of Germany

[73] Assignee: Braun Aktiengesellschaft, Frankfurt, Fed. Rep. of Germany

[21] Appl. No.: 30,566

[22] Filed: Mar. 12, 1993

[30] Foreign Application Priority Data

Mar. 16, 1992 [DE]  Fed. Rep. of Germany ....... 4208368

[51] Int. Cl.$^5$ ............................................ G01G 19/52
[52] U.S. Cl. ................................. 177/245; 177/132
[58] Field of Search ................................ 177/245, 132

[56] References Cited

U.S. PATENT DOCUMENTS

| | | | |
|---|---|---|---|
| 4,580,025 | 4/1986 | Carlson et al. ............... | 219/10.55 B |
| 4,675,510 | 6/1987 | Yamaguchi et al. ........... | 177/245 X |
| 4,726,435 | 2/1988 | Kitagawa et al. | |
| 5,174,403 | 12/1992 | Geiger ............................. | 177/245 |

FOREIGN PATENT DOCUMENTS

| | | |
|---|---|---|
| 0006237 | 1/1980 | European Pat. Off. . |
| 2900614 | 1/1979 | Fed. Rep. of Germany . |
| 3308780 | 3/1983 | Fed. Rep. of Germany . |
| 2483697 | 12/1981 | France . |

OTHER PUBLICATIONS

European Search Report dated Jun. 16, 1993.

*Primary Examiner*—George H. Miller, Jr.
*Attorney, Agent, or Firm*—Fish & Richardson

[57] ABSTRACT

The invention is directed to a kitchen appliance (1) for processing food which includes an appliance base (2) and a weighing device (36) incorporating a force-detecting element (39) capable of determining and indicating the weight of food contained in a vessel (8). During weighing the vessel (8) is carried by the force-detecting element (39) which is in turn connected with the appliance base (2). At least one bearing element (53) vertically slidable against the force of a biased spring (54) is provided between the force-detecting element (39) and the vessel (8). During weighing the vessel (8) rests on the bearing element (53) while being adapted to be latched with the appliance base (2) for operation of the kitchen appliance (1). The force-detecting element is comprised of a bending beam (39) fastened to the appliance base (2) and having strain gauges (41, 42) fitted thereto which supply a signal which is evaluated by an electronic circuitry and displayed. With this weighing device, an impermissible short-time overload condition does not result in damage to the force-detecting element (39). In addition, the weighing device has a good measuring accuracy.

11 Claims, 3 Drawing Sheets

KITCHEN APPLIANCE WITH WEIGHING DEVICE

This invention relates to a kitchen appliance for processing food, with an appliance base, a vessel seatable thereon, and a weighing device incorporating a force-detecting element and capable of determining and indicating the weight of food contained in the vessel, with the vessel being carried during weighing by the force-detecting element of the weighing device which is in turn connected with the appliance base.

A kitchen appliance of this type for processing food is known, for example, from DE-33 08 780 Al. In this kitchen appliance, the force-measuring device is comprised of a weighing device connected with a weighing table onto which a vessel adapted to be filled with ingredients may be seated. The weighing table is connected with a locking device comprised of a lever arrangement which releases the weighing table for weighing when it is desired to perform a weighing operation and which holds the weighing table fixed with the appliance base when it is desired to process food using the whisk engaging within the vessel from above, so that for the subsequent processing operation the vessel is retained in a fixed position relative to a firm support, that is, the weighing table. In this type of kitchen appliance, the use of a complex lever arrangement for locking the weighing table is regarded as a disadvantage.

From EP-0 396 059 Al, another kitchen appliance having a weighing device is known. This prior-art weighing device is comprised of a leaf-spring bearing arranged between a supporting foot and the complete kitchen appliance and having weight sensors associated therewith. A vendor of weight sensors for use in leaf-spring weighing devices is, for example, the Revere Corporation of Europe GmbH of 6382 Friedrichsdorf 2, West Germany. Their brochure "Product Data Bulletin" (printer's reference: REV 860502 5M) describes how the FT50 Model, for example, is used in practice.

In the weighing device known from EP-0 396 059 Al it is considered as a disadvantage that for measuring the weight of the food items it is necessary to transmit the full weight of the kitchen appliance through the leaf-spring bearing to the supporting foot and finally to the sensors, so that vibrations acting on the kitchen appliance which may be due to natural vibrations in operation or when the kitchen appliance is being transported are apt to damage the weighing device; it is to be noted that such weight sensors are highly sensitive to impermissible overloading, particularly in cases where a multiple of the maximum weight to be measured occurs due to high acceleration to which on the kitchen appliance is exposed. To eliminate this drawback, a particularly robust and stable leaf-spring bearing would have to be selected which executes only short deformation travels even under high impact loadings to avoid damage to the weight sensors, which, however, entails a reduced sensitivity and thus a reduced accuracy of the weighing device.

It is an object of the present invention to provide a kitchen appliance incorporating a weighing device in which an impermissible short-time overload condition does not result in damage to the weighing device while maintaining a good measuring accuracy.

According to the present invention, this object is accomplished in that at least one bearing element vertically slidable against the force of a biased spring is provided between the force-detecting element and the vessel, that the vessel rests on the bearing element during weighing while being adapted to be latched with the appliance base for operation of the kitchen appliance, that the force-detecting element of the weighing device is comprised of a bending beam fastened to the appliance base and having strain gauges fitted thereto, and that the signal of the strain gauge is evaluated by an electronic circuitry and indicated on a display device. When a vessel containing the ingredient to be weighed is placed down on the bearing element, the weight is dampened by the spring-loaded bearing elements and transmitted to the weighing device, thereby preventing the occurrence of impermissible short-time overload conditions on the weighing device. By appropriately selecting the spring stiffness, the dampening effect may be selected greater or smaller, depending on the weighing system chosen. Improper handling of the weighing device which may occur, for example, when the kitchen appliance is set down on a support surface in a rough manner, will not result in damage to the weighing device because the mass accelerations produced by the weight to be weighed are materially dampened by the spring-loaded bearing element, preventing overload from occurring on the weighing device.

When in the worst case the bearing element exceeds a predetermined amount of travel because of the occurrence of an undue load, the vessel or the bearing elements, after exceeding a predetermined travel, may abut against a stop formed fast with the housing which prevents the application of further forces to the weighing device.

Such a precision weighing device affords particular ease of implementation by means of the bearing element constructed in accordance with this invention which is vertically slidable against the spring force, without involving the need for overdimensioned bending beams. The electrical signal issued by the strain-gauge arrangement as a result of the weight acting on the bending beam will then be evaluated by an electronic circuitry and indicated, for example, by an electrically operable display device, as an LCD display.

Owing to the use of a bending beam having strain gauges affixed thereto, a high measuring accuracy is accomplished. Moreover, the bending beam and in particular the strain gauges are protected against damage by overload.

By selecting the weighing range of the weighing device such that the bearing element is not displaced as long as weights lying within the weighing range are weighed, residual oscillation of the bearing element and thus a delay of a stationary weight display are avoided after the vessel is seated in place. To this end, the biasing force of the spring is selected such that the spring is not subject to elastic deformation up to the maximum permissible weight. Only under overload, that is, in the range in which the weighing device is no longer designed to weigh weights, will the bearing element become displaced which will be indicated by a change in the spring lengths.

In a further feature of the present invention, it is suggested to configure the electronic circuitry such that it either stops indicating a weight above a predeterminable overload or turns itself off after the expiration of a predeterminable time period during which an overload acts on the weighing device. This is advantageous particularly when the vessel is to be firmly connected with the appliance base on completion of the weighing operation. This process involves biasing the vessel firmly against the appliance base, such that the force thereby exerted on the bearing element exceeds the maximum weight to be measured, so that the electronic circuitry detects that this weight value does not reflect the weight of the food to be measured, but that this high bearing force has resulted from the latching engagement of the vessel with the appliance base. Consequently, the electronic circuitry, instead of displaying a weight, may then be configured such as to provide a "Vessel Latched" indication on the display device, enabling an operator to recognize that no weighing is possible when the vessel is in this position relative to the appliance base.

In a still further feature of the present invention, it is particularly advantageous that for latching the vessel with the appliance base it is necessary to overcome the bias of the spring, and that the electronic circuitry indicates the completion of the weighing operation. By latching the vessel with the base of the kitchen appliance, the force-measuring device can be disabled, because the force transmitted in the process from the vessel to the force-measuring device is greater than the maximum food weight to be measured. This high value thus enables the electronic circuitry to detect that no weighing operation is intended when the vessel is latched with the appliance base. Only when the vessel rests on the bearing element, with weights in the range from about 1 gram to 3 kilograms acting from the vessel onto the bearing element, will the electronic circuitry detect that a weighing operation is to be performed.

To ensure that in the latched condition the vessel is at all times biased against the bearing elements, it will be advantageous to maintain the bias of the vessel against the bearing elements by a clamping device provided between the vessel and the appliance base. A clamping device which has proven to be particularly simple is a bayonet connector. This bayonet connector as well as the complete kitchen appliance incorporating the weighing device may be configured, for example, as the "Braun-Multipractic-Plus" food processor that has already been marketed by the applicant for a long time.

In a still further feature of this invention, it is advantageous that the vessel is adapted to be closed by a lid, that the lid does not disable a safety interlock system that prevents the kitchen appliance from operating until, for one thing, the vessel is secured to the appliance base by the clamping device such that the bearing elements assume the overload position and until, for another thing, the lid is in its proper closing position. The pulse occurring in the electronic circuitry as a result of this high bearing force may also be utilized as an indication that the working vessel is safely secured to the appliance base. When also the lid is then properly locked on the working vessel which results in a second electrical signal supplied to the electronic circuitry, the flow of current to the drive motor will not be released until these two conditions are satisfied. This means that the drive motor will not start rotating, not even with the main switch on, until these two signals cause the electronic circuitry to release current flow to the drive motor. Thus, the force-measuring device may also be used as a safety device for a kitchen appliance.

In a still further advantageous feature of the present invention, a support plate on which at least three bearing elements with associated springs are slidably mounted is secured to the bending beam. One advantage of this arrangement is that various vessels may be conveniently seated onto the kitchen appliance, and another that during weighing these vessels need not be held in a guide otherwise to be provided on the kitchen appliance.

The spring-loaded bearing elements can be configured in a manner affording particular ease and convenience of manufacture and assembly in that each bearing element extends through the support plate, forming with the underside of the support plate a stop, and that each spring bears with one end against the upper side of the support plate while its other end takes support upon the bearing element. The spring-loaded bearing elements thus mount on the support plate with particular ease without necessitating complex tools. At the same time, the bearing elements are at all times biased against the vessel by the springs.

Particularly advantageously, the springs configured as dampening means are spiral springs. Spiral springs afford particular economy of manufacture, the characteristic curve of these springs being maintainable nearly unchanged also with high production quantities. The same applies to springs configured as leaf springs. These springs are advantageously of an annular configuration to allow the spring forces to act especially concentrically on each bearing element, as is also the case with the spiral springs.

To be able to perform weighing operations with the kitchen appliance also when a first food portion is already processed in the vessel and it is intended to add further ingredients, it will be advantageous to provide the support plate with a bore through which an output shaft extends from the appliance base up into the vessel, with processing tools as blades, dough hooks, shredding disks, whisks, etc. being engageable thereon for performing food processing operations.

By virtue of the fact that the processing tool bears against the vessel during the weighing operation and against the output shaft when the vessel is in latched condition, the processing tool and in particular the food materials clinging to the processing tool are invariably also weighed. It should however be understood, of course, that the weighing device is provided with a what is referred to as a "taring function" allowing the weight of vessel and processing tool to be considered and the display of the weighing device to be reset to zero prior to commencement of the first weighing operation, that is, with the vessel empty and the processing tool fitted.

An embodiment of the present invention will now be described in more detail in the following with reference to the accompanying drawings. In the drawings, FIG. 1 is a partial longitudinal sectional view of a "Multipractic-Plus" type multi-purpose kitchen appliance that has been marketed by the applicant for a long time to which the force-measuring device of the invention has been retrofitted;

Figure 1:
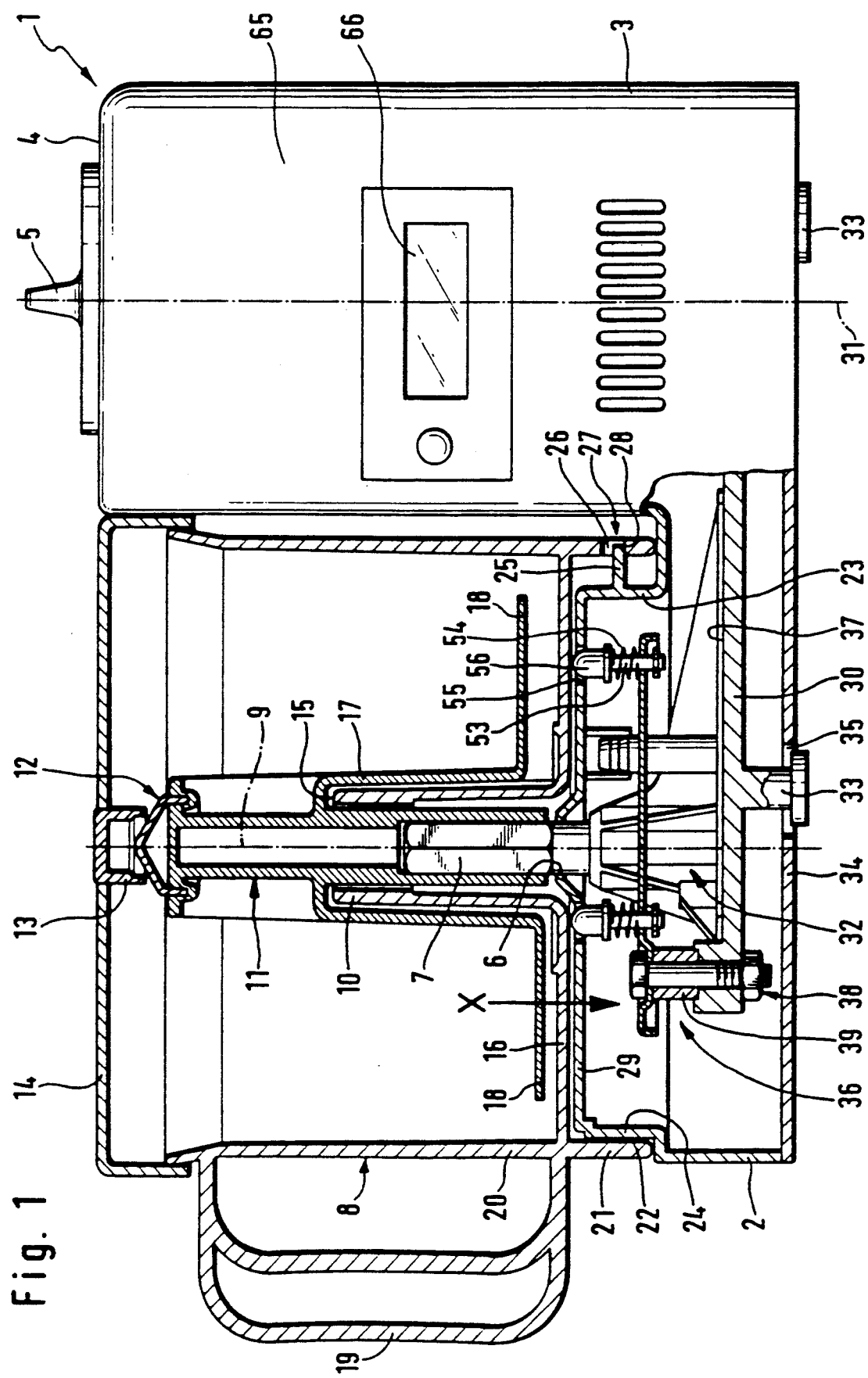

As shown in FIG. 1, the multi-purpose kitchen appliance 1 is comprised of an appliance base 2 having laterally adjacent thereto a motor housing 3 with a rotary switch 5 provided on its upper side. The motor housing 3 accommodates an electric motor (not shown) extending in the longitudinal direction of a center line 31 and coupled, through a drive shaft and a suitable gearing (not shown), to an output shaft 7 extending from the appliance base 2 upwardly through a bore 6. The output shaft 7 is of hexagonal cross-section and is concentrically surrounded by a tubular post 10 arranged about a center line 9 of a vessel 8 after the vessel 8 is set in place on the appliance base 2.

In FIG. 1, fitted to the output shaft 7 is a processing tool 11 engaged therewith in a manner preventing relative rotation by means of the hexagon. The free end 12 of the processing tool 11 is centrally located in a sleeve 13 at the opposite end which is part of a lid 14 closing the vessel 8. Extending from the processing tool 11 above the free end 15 of the post 10 down to the bottom 16 of the vessel 8 is a tubular sleeve 17 having at its end proximate to the bottom 16 integrally formed mixing or kneading arms 18 for processing the food which extend radially outwardly and substantially parallel to the bottom 16.

To handle the vessel 8, a handle 19 is provided thereon as shown in FIG. 1. In an extension of a cylindrical wall 20, the bottom 16 of the vessel 8 continues in downward direction in a locating ring 21 which, as shown in FIG. 1, centers itself on an annular surface 22 extending concentrically with the center line 9 when the vessel 8 sits on the appliance base 2. This facilitates the task of placing the vessel 8 down onto the appliance base 2, while at the same time locating the vessel 8 centrally on the appliance base 2, so that the output shaft 7 extends essentially concentrically with the post 10. The annular surface 22 is formed by locating ribs 24 protruding from an annular shoulder 23 of the appliance base 2. Disposed in offset relation to the locating ribs 24 are projections 25 protruding from the annular shoulder 23 and engaging in corresponding recesses 26 provided on the locating ring 21. The projections 25 cooperate with the recesses 26 to provide a bayonet connector 27 between the vessel 8 and the appliance base 2.

In FIG. 1, an abutment surface 28 formed on the lower side of the recess 26 extends concentrically with the center line 9 and is of a sloping configuration such that, with the vessel 8 seated in place and subsequently twisted relative to the appliance base 2, the vessel 8 is displaced towards the upper side 29 of the appliance base 2 by the projections 25 engaging the recesses 26 and is clamped against the appliance base 2, causing the vessel 8 to sit firmly and without clearance on the appliance base 2. The bayonet connector 27 thus operates to provide the clamping device between the vessel 8 and the appliance base 2.

According to FIG. 1, underneath the upper side 29 a bed 30 is provided in the appliance base 2 which extends normal to the center lines 9 and 31 and has assembled thereon at its one end the electric motor (not shown) received in the motor housing 3, and at its other end the output shaft 7 which is carried in a bearing block 32. The bed 30 is provided with feet 33 extending outwardly through openings 35 provided on the underside 34 of the appliance base 2 and serving to support the multi-purpose kitchen appliance 1 on a surface not shown in the drawing as, for example, a table.

According to FIGS. 1 to 4, the weighing device 36 is comprised of a bending beam 39 with a doggie-biscuit shaped cutout 40 which is fastened to the upper side 37 of the bed 30 by means of a nut-and-bolt connection 38. The bending beam 39 is fixedly connected with the bed 30 by means of the nut-and-bolt connection 38 in such a manner that this represents the fixed attachment for the bending beam 39.

Figure 3:
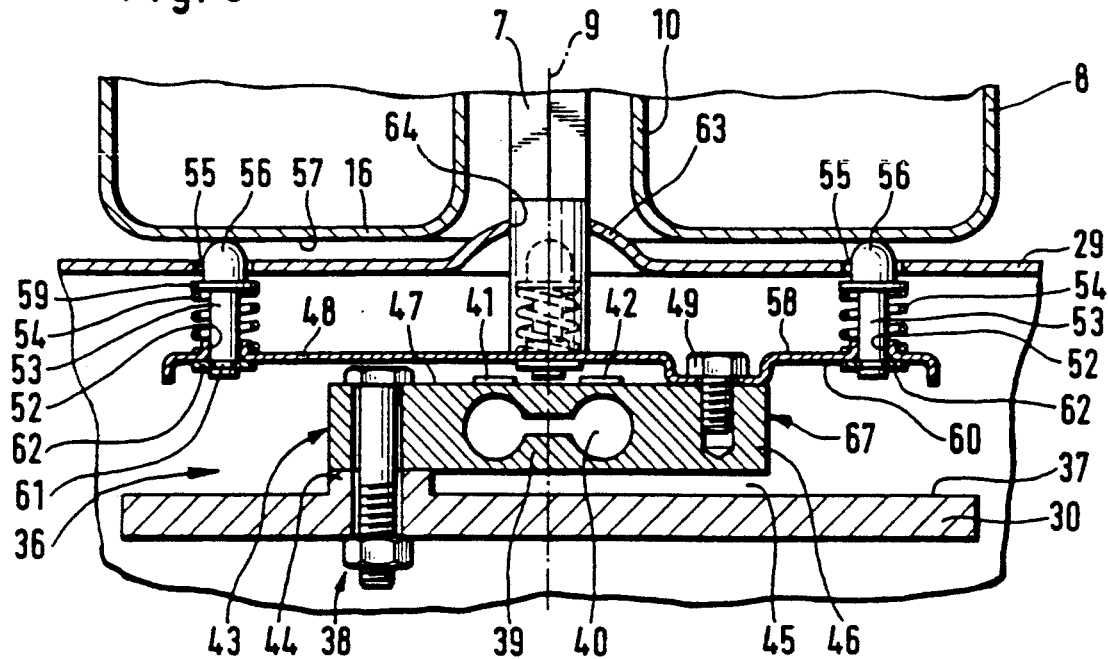
FIG. 3 is a partial longitudinal sectional view of the weighing device, taken along the line III—III of FIG. 2, showing the vessel in weighing position.
Figure 4:
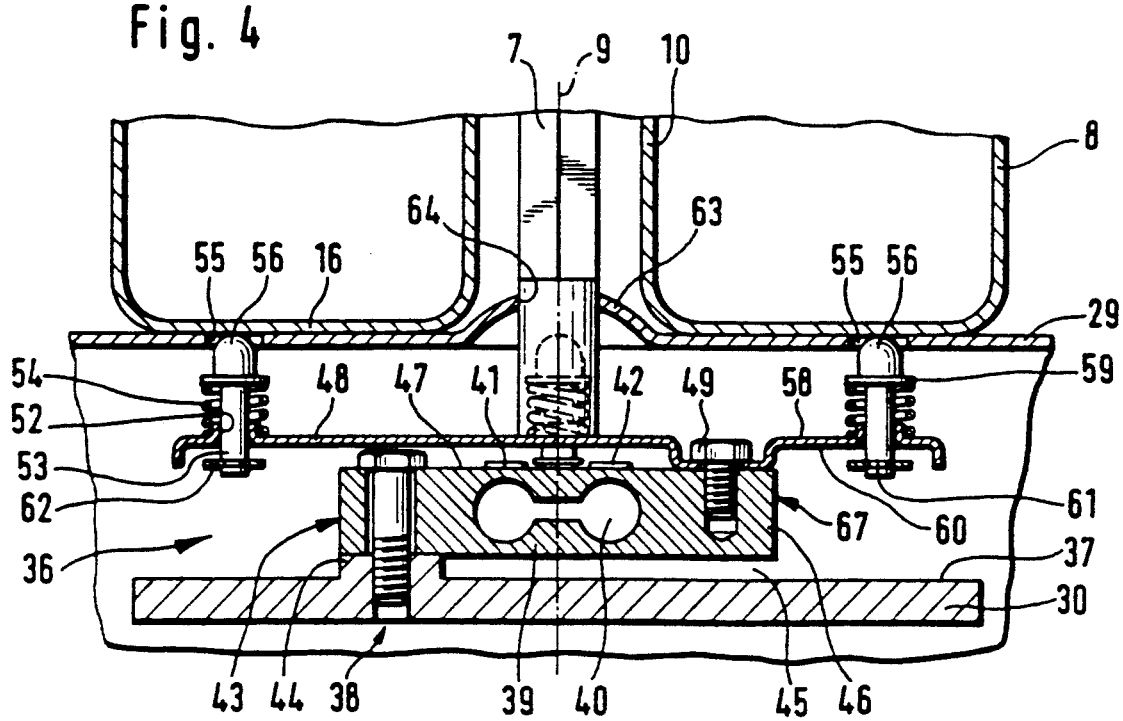
FIG. 4 is a partial longitudinal sectional view of the weighing device taken along the line III—III of FIG. 2, showing the vessel clamped, that is, secured, to the appliance base as shown in FIG. 1.

According to FIGS. 3 and 4, above the doggie-biscuit shaped cutout 40 which may also be of a clover-leaf configuration, tension detectors 41, 42 are fastened as by adhesive bonding or soldering, the detectors being connected to an electronic circuitry not shown by means of electric lines equally not shown in the drawings. The bending beam 39 shown in these Figures may be configured such as illustrated and offered for sale in the Revere brochure initially described, so that this component 39 will not be discussed herein in greater detail.

As becomes apparent from FIGS. 3 and 4, a mount 44 is provided on the upper side 37 of the bed 30 in the area of the attached end 43, which mount serves to secure only the attached end 43 to the bed 30, while the portion extending beyond it, due to the clearance 45 thereby formed, extends at a distance to the upper side 37 of the bed 30, such that at the free end 46 opposite the attached end 43 the forces acting down on the bending beam 39 cause a deformation of the bending beam 39 which then produce a tension on the tension detectors 41, 42 which is supplied to the electronic circuitry.

Figure 2:
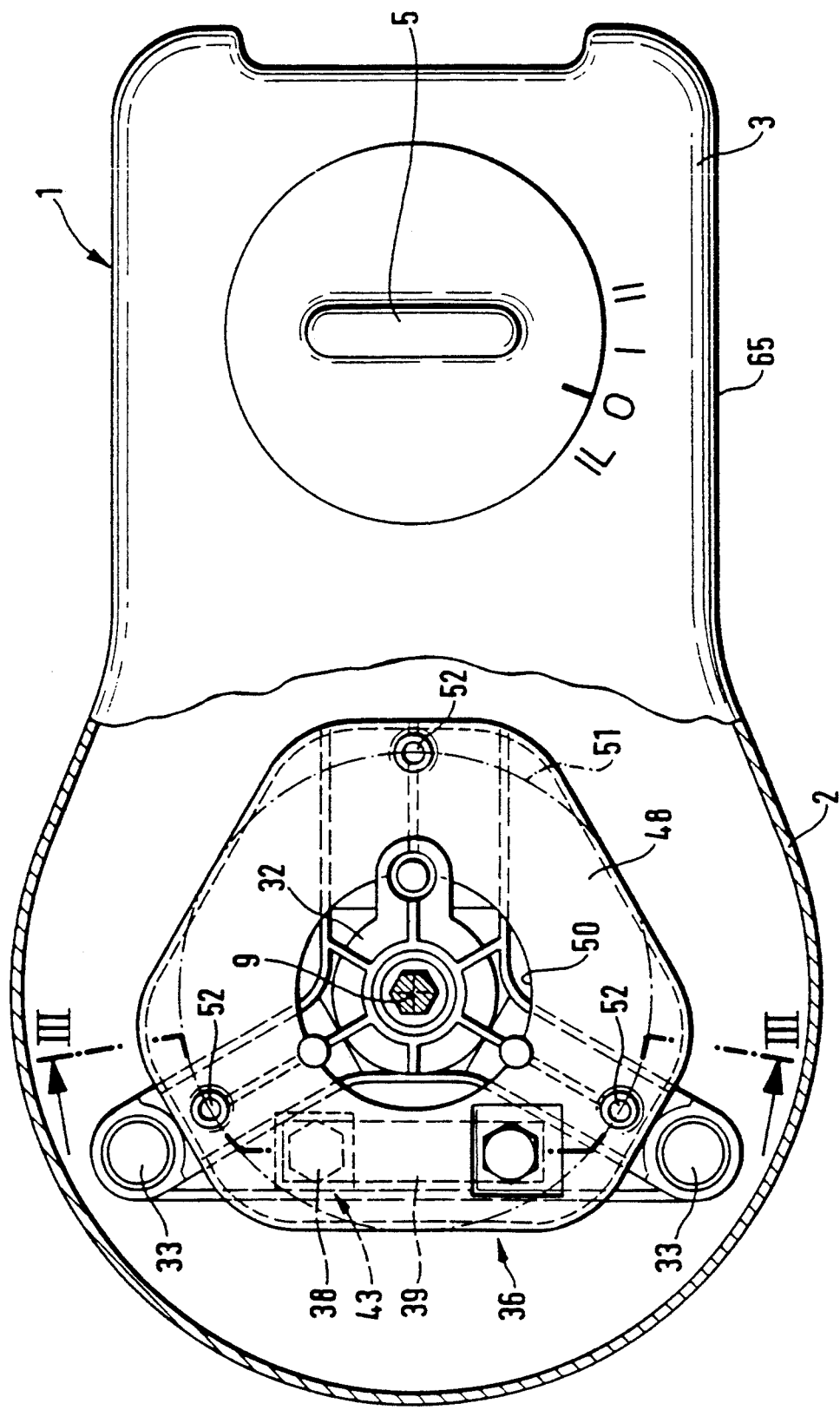
FIG. 2 is a top plan view of the multi-purpose kitchen appliance of FIG. 1 having portions broken away to show in top plan view the force-measuring device in the direction of arrow X.

According to FIGS. 3 and 4, a support plate 48 is fastened to the upper side 47 of the free end 46 by means of a screw 49. In FIG. 2, the support plate 48 extends concentrically about the bearing block 32 which is passed therethrough through a bore 50. Arranged on the diameter 51 at an angular distance of 120° are three bores 52 receiving axially slidably therein against the force of a spring 54 a respective bearing element 53 configured as a pin. According to FIGS. 1, 3 and 4, the bearing elements 53 are received in bores 55 and extend through the upper side 29, their rounded, cap-shaped ends 56 being in abutment with the underside 57 of the bottom 16 of the vessel 8 when the latter sits on the appliance base 2 according to FIGS. 1, 3 and 4.

According to FIGS. 1, 3 and 4, an annular collar 59 serving as an upper limit stop for the spring 54 is provided on the bearing element 53 above the support plate 48. Serving as a lower limit stop for the spring 54 is the upper side 58 of the support plate 48. The spring 54 is a spiral spring utilized as a compression spring in this embodiment, so that the bearing element 53 of FIGS. 1, 3 and 4 is invariably moved upwardly by spring action, however, only until a circlip 62 secured in an annular groove 61 underneath the support plate 48 abuts against the underside 60 of the support plate 48, as is clearly shown in FIG. 3.

As becomes apparent from FIGS. 3 and 4, the upper side 29 of the appliance base 2 has in the center 9 an upwardly domed annular bead 63 lying with its bore 64 in sealing engagement with the surface of the output shaft 7; in this lower area, the output shaft 7 is no longer hexagonal but of a circular cylindrical configuration.

To avoid repetitions, like components are designated with the same reference numerals throughout the FIGS. 1 to 4.

The mode of operation of the multi-purpose kitchen appliance is as follows:

As soon as the multi-purpose kitchen appliance 1 of FIGS. 1 to 4 is connected to a source of electric power, the weighing operation may start. When the empty vessel 8 is seated upon the cap-shaped ends 56 as the position in FIG. 3 shows clearly, the display device 66 provided on the side panel 65 in FIG. 1 will indicate zero grams. The electronic circuitry (not shown) is configured such as to provide a weight indication only when further weights are added to the vessel's 8 own weight.

The addition of ingredients to the vessel 8 causes the bottom 16 to urge with more or less force against the cap-shaped ends 56 of the bearing elements 53 which in turn bear against the spiral springs 54 through their annular collars 59. This force is transmitted from the spiral springs 54 to the support plate 48 from which it is introduced, through its attached end 67 at the screw 49, into the free end 46 of the bending beam 39. By virtue of this force introduced off-center into the further attached end 67 remote from the attached end 43, the free end 46 of the bending beam 39 in FIG. 3 will bend towards the bed 30 (deflection not shown), such that a surface tension is produced on the upper side 47 of the bending beam 39 which is transmitted to the tension detectors 41, 42 in such a manner as to initiate therein a signal indicative of the tension which is delivered to the electronic circuitry. This circuitry will evaluate the tension signal in such fashion that a weight value corresponding in magnitude to the bending stress will be indicated on the display device 66.

Because the springs 54 are biased by the bearing elements 53 in the assembled condition (FIG. 3), the weighing operation merely reduces the bias of the springs, that is, a displacement of the bearing elements 53 in the direction of the support plate 48 does not occur.

The weighing device 36 being incorporated into the multi-purpose kitchen appliance 1 as a retrofit, it is possible to add further ingredients for weighing at any time without the need to remove the vessel 8 from the multi-purpose kitchen appliance 1, weighing then only requiring the bayonet connector 27 on the vessel 8 to be opened when, for example, a food processing operation has preceded the weighing operation.

Once all ingredients in the vessel 8 are weighed, the vessel 8 is fixedly connected with the appliance base 2 by means of the bayonet connector 27 in such a manner that the vessel 8 is displaced towards the upper side 29 of the appliance base 2 and that also the cap-shaped ends 56 of the bearing elements 53 are displaced towards the support plate 48, as reflected in the end position or ready position illustrated in FIGS. 1 and 4. As this occurs, the springs 54 are compressed such as to cause the circlips 62 to lift clear of the underside 60 of the support plate 48 in downward direction. The compressive action of the springs 54 results in the transmission of such a force to the support plate 48 and thus to the bending beam 39 that it deforms correspondingly, causing the tension detectors 41, 42 to produce a tension signal of a magnitude enabling the electronic circuitry to detect that the vessel 8 is fixedly connected with the appliance base 2. As a result, no weight will be displayed, enabling the display device 66 to indicate food processing operations, for example. Alternatively, the display device may also be used to indicate the proper seating position of the vessel 8 on the appliance base 2.

When the lid 14 is properly fitted to the vessel 8 as a result of which the safety interlock is actuated, the multi-purpose kitchen appliance 1 may process food as is possible with the food processors marketed by the applicant under the designation "Braun-Multipractic-Plus".

After food processing is completed and the lid 14 is removed from the vessel 8 and the vessel 8 is unlocked from the appliance base 2 through the bayonet connector 27 (FIG. 1) by giving it a twisting motion in counterclockwise direction, the vessel 8 may be lifted clear of the appliance base 2 in upward direction. As this occurs, the bearing elements 53 will be displaced upwardly until they have assumed the position illustrated in FIG. 3 in which weighing operations may be performed.

We claim:

1. A kitchen appliance (1) with an appliance base (2), a vessel (8) seatable thereon for processing food, and with a weighing device (36) incorporating a force-detecting element (39) and capable of determining and indicating the weight of food contained in the vessel (8), with the vessel (8) being carried during weighing by the force-detecting element (39) of the weighing device (36) which is in turn connected with the appliance base (2), characterized in that at least one bearing element (53) vertically slidable against the force of a biased spring (54) is provided between the force-detecting element (39) and the vessel (8), that the vessel (8) rests on the bearing element (53) during weighing while being adapted to be latched with the appliance base (2) for operation of the kitchen appliance (1), that the force-detecting element of the weighing device (36) is comprised of a bending beam (39) fastened to the appliance base (2) and having at least one strain gauge (41, 42) fitted thereto, and that the signal of the strain gauge (41, 42) is evaluated by an electronic circuitry and indicated on a display device (66).

2. The kitchen appliance as claimed in claim 1, characterized in that the weighing range of the weighing device is selected such that the bearing element (53) is not displaced as long as weights lying within the weighing range are weighed.

3. The kitchen appliance as claimed in claim 1, characterized in that the electronic circuitry is configured such that it either stops indicating a weight above a predeterminable overload or turns itself off after the expiration of a predeterminable time period during which an overload acts on the weighing device (36).

4. The kitchen appliance as claimed in claim 1, characterized in that for latching the vessel (8) with the appliance base (2) it is necessary to overcome the bias of the spring (54), and that the electronic circuitry indicates the completion of the weighing operation.

5. The kitchen appliance as claimed in claim 4, characterized in that the latching engagement is maintained by a clamping device (27) as, for example, a bayonet connector, which is provided between the vessel (8) and the appliance base (2).

6. The kitchen appliance as claimed in claim 5, characterized in that the vessel (8) is adapted to be closed by a lid (14), that a safety interlock system that prevents the kitchen appliance (1) from operating is not disabled until, for one thing, the vessel (8) is latched with the appliance base (2) and until, for another thing, the lid (14) is in its proper closing position.

7. The kitchen appliance as claimed in claim 1, characterized in that a support plate (48) on which at least three bearing elements (53) with associated springs (54

) are slidably mounted is secured to the bending beam (39).

8. The kitchen appliance as claimed in claim 7, characterized in that each bearing element (53) extends through the support plate (48), forming with the underside (60) of the support plate (48) a stop, and that each spring (54) bears with one end against the upper side (58) of the support plate (48) while its other end takes support upon the bearing element (53).

9. The kitchen appliance as claimed in claim 7, characterized in that the springs (54) are spiral springs or leaf springs, with the latter being also adapted to be of an annular configuration.

10. The kitchen appliance as claimed in claim 7, characterized in that the support plate (48) is provided with a bore (50) through which an output shaft (7) extends from the appliance base (2) up into the vessel (8), with processing tools (11) as blades, dough hooks, shredding disks, whisks, etc. being engageable thereon.

11. The kitchen appliance as claimed in claim 10, characterized in that the processing tools (11) bear against the vessel (8) during the weighing operation and against the output shaft (7) when the vessel (8) is in latched condition.

* * * * *